United States Patent
Krakov et al.

(10) Patent No.: US 9,857,990 B1
(45) Date of Patent: Jan. 2, 2018

(54) FAST STARTUP FOR MODULAR STORAGE SYSTEMS

(71) Applicant: EMC Corporation, Hopkinton, MA (US)

(72) Inventors: David Krakov, Ramat Gan (IL); Roman Vainbrand, Kfar Saba (IL); Tal Ben-Moshe, Kiryat Ono (IL); Eli Dorfman, Raanana (IL); Vladislav Weinbaum, Herzlia (IL); Noa Cohen, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/079,215

(22) Filed: Mar. 24, 2016

(51) Int. Cl.
*G06F 3/06* (2006.01)

(52) U.S. Cl.
CPC .......... *G06F 3/0611* (2013.01); *G06F 3/0631* (2013.01); *G06F 3/0632* (2013.01); *G06F 3/0673* (2013.01)

(58) Field of Classification Search
CPC .... G06F 3/0611; G06F 3/0631; G06F 3/0632; G06F 3/0673
See application file for complete search history.

(56) References Cited

U.S. PATENT DOCUMENTS

| | | | |
|---|---|---|---|
| 5,204,958 A | 4/1993 | Cheng et al. | |
| 5,453,998 A | 9/1995 | Dang | |
| 5,603,001 A | 2/1997 | Sukegawa et al. | |
| 6,085,198 A | 7/2000 | Skinner et al. | |
| 6,125,399 A | 9/2000 | Hamilton | |
| 6,671,694 B2 | 12/2003 | Baskins et al. | |
| 7,073,115 B2 | 7/2006 | English et al. | |
| 7,203,796 B1 | 4/2007 | Muppalaneni et al. | |
| 7,472,249 B2 * | 12/2008 | Cholleti ............ | G06F 12/126 711/165 |
| 7,908,484 B2 | 3/2011 | Haukka et al. | |
| 8,341,479 B2 | 12/2012 | Bichot et al. | |
| 8,386,425 B1 | 2/2013 | Kadayam et al. | |
| 8,386,433 B1 | 2/2013 | Kadayam | |
| 8,566,673 B2 | 10/2013 | Kidney et al. | |
| 8,694,849 B1 | 4/2014 | Micheloni et al. | |
| 8,799,705 B2 | 8/2014 | Hallak et al. | |
| 9,026,729 B1 | 5/2015 | Hallak et al. | |
| 9,063,910 B1 | 6/2015 | Hallak et al. | |
| 9,104,326 B2 | 8/2015 | Frank et al. | |
| 2006/0271540 A1 | 11/2006 | Williams | |
| 2007/0089045 A1 | 4/2007 | Corbett et al. | |

(Continued)

FOREIGN PATENT DOCUMENTS

JP 2014206884 A * 10/2014 ......... G06F 12/0238

OTHER PUBLICATIONS

EMC Corporation, "Introduction to the EMC XtremIO Storage Array;" Version 4.0; White Paper—A Detailed Review; Apr. 2015; 65 Pages.

(Continued)

*Primary Examiner* — Aracelis Ruiz
(74) *Attorney, Agent, or Firm* — Daly, Crowley Mofford & Durkee, LLP

(57) ABSTRACT

Described herein are several embodiments of systems and processes to decrease startup time for subsystems of a storage system. According to some embodiments, subsystem memory is allocated using memory-mapped files.

14 Claims, 5 Drawing Sheets

(56) References Cited

U.S. PATENT DOCUMENTS

| | | | | |
|---|---|---|---|---|
| 2008/0235793 | A1* | 9/2008 | Schunter | G06F 12/145 726/22 |
| 2009/0216953 | A1 | 8/2009 | Rossi | |
| 2010/0250611 | A1 | 9/2010 | Krishnamurthy | |
| 2011/0087854 | A1 | 4/2011 | Rushworth et al. | |
| 2011/0137916 | A1 | 6/2011 | Deen et al. | |
| 2011/0302587 | A1* | 12/2011 | Nishikawa | G06F 9/4881 718/103 |
| 2012/0124282 | A1 | 5/2012 | Frank et al. | |
| 2012/0158736 | A1 | 6/2012 | Milby | |
| 2013/0036289 | A1 | 2/2013 | Welnicki et al. | |
| 2013/0290285 | A1 | 10/2013 | Gopal et al. | |
| 2013/0318053 | A1 | 11/2013 | Provenzano et al. | |
| 2014/0019764 | A1 | 1/2014 | Gopal et al. | |
| 2014/0032992 | A1 | 1/2014 | Hara et al. | |
| 2014/0122823 | A1* | 5/2014 | Gupta | G06F 3/0607 711/170 |
| 2014/0188805 | A1 | 7/2014 | Vijayan | |
| 2014/0189212 | A1 | 7/2014 | Slaight et al. | |
| 2014/0244598 | A1 | 8/2014 | Haustein et al. | |
| 2015/0019507 | A1 | 1/2015 | Aronovich | |
| 2015/0098563 | A1 | 4/2015 | Gulley et al. | |
| 2015/0186215 | A1 | 7/2015 | Das Sharma et al. | |
| 2015/0205663 | A1 | 7/2015 | Sundaram et al. | |
| 2016/0132270 | A1* | 5/2016 | Miki | G06F 12/0238 711/170 |
| 2017/0123995 | A1 | 5/2017 | Freyensee et al. | |

OTHER PUBLICATIONS

Vijay Swami, "XtremIO Hardware/Software Overview & Architecture Deepdive;" EMC On-Line Blog; Nov. 13, 2013; Retrieved from < http://vjswami.com/2013/11/13/xtremio-hardwaresoftware-overview-architecture-deepdive/>; 18 Pages.
Response to U.S. Office Action dated Jun. 10, 2016 corresponding to U.S. Appl. No. 14/228,971; Response filed Aug. 17, 2016; 10 Pages.
U.S. Final Office Action dated Oct. 4, 2016 corresponding to U.S. Appl. No. 14/228,971; 37 Pages.
Notice of Allowance dated Apr. 26, 2016 corresponding to U.S. Appl. No. 14/228,982; 9 Pages.
Request for Continued Examination (RCE) and Response to Final Office Action dated Feb. 25, 2016 corresponding to U.S. Appl. No. 14/228,971; Response filed May 25, 2016; 12 Pages.
U.S. Office Action dated Jun. 10, 2016 corresponding to U.S. Appl. No. 14/228,971; 27 Pages.
Response to Office Action dated Jan. 12, 2016 corresponding to U.S. Appl. No. 14/229,491; Response filed Jun. 2, 2016; 7 Pages.
Notice of Allowance dated Jul. 25, 2016 corresponding to U.S. Appl. No. 14/229,491; 10 Pages.
Office Action dated Jul. 15, 2016 corresponding to U.S. Appl. No. 14/751,652; 11 Pages.
U.S. Appl. No. 15/282,546, filed Sep. 30, 2016, Kucherov et al.
U.S. Appl. No. 15/281,593, filed Sep. 30, 2016, Braunschvig et al.
U.S. Appl. No. 15/281,597, filed Sep. 30, 2016, Bigman.
Request for Continued Examination (RCE) and Response to U.S. Final Office Action dated Oct. 4, 2016 corresponding to U.S. Appl. No. 14/228,971; RCE and Response filed Jan. 4, 2017; 19 Pages.
U.S. Non-Final Office Action dated Feb. 9, 2017 for U.S. Appl. No. 14/228,971; 38 Pages.
U.S. Appl. No. 14/228,971, filed Mar. 28, 2014, Shoikhet et al.
U.S. Appl. No. 14/228,360, filed Mar. 28, 2014, Lempel et al.
U.S. Appl. No. 14/228,982, filed Mar. 28, 2014, Ben-Moshe et al.
U.S. Appl. No. 14/229,491, filed Mar. 28, 2014, Luz et al.
U.S. Appl. No. 14/496,359, filed Sep. 25, 2014, Love et al.
U.S. Appl. No. 14/751,652, filed Jun. 26, 2015, Natanzon et al.
U.S. Appl. No. 14/979,890, filed Dec. 28, 2015, Meiri et al.
U.S. Appl. No. 15/085,168, filed Mar. 30, 2016, Meiri et al.
U.S. Appl. No. 15/081,137, filed Mar. 25, 2016, Natanzon et al.
U.S. Appl. No. 15/079,205, filed Mar. 24, 2016, Dorfman et al.
U.S. Appl. No. 15/079,208, filed Mar. 24, 2016, Ben-Moshe et al.
U.S. Appl. No. 15/079,213, filed Mar. 24, 2016, Ben-Moshe et al.
U.S. Office Action dated Aug. 27, 2015 corresponding to U.S. Appl. No. 14/228,971; 23 Pages.
Response to U.S. Office Action dated Aug. 27, 2015 corresponding to U.S. Appl. No. 14/228,971; Response filed Jan. 14, 2016; 10 Pages.
U.S. Final Office Action dated Feb. 25, 2016 corresponding to U.S. Appl. No. 14/228,971; 27 Pages.
U.S. Office Action dated Sep. 22, 2015 corresponding to U.S. Appl. No. 14/228,982; 17 Pages.
Response to U.S. Office Action dated Sep. 22, 2015 corresponding to U.S. Appl. No. 14/228,982; Response filed Feb. 1, 2016; 10 Pages.
U.S. Office Action dated Jan. 12, 2016 corresponding to U.S. Appl. No. 14/229,491; 12 Pages.
U.S. Office Action dated Dec. 4, 2014 corresponding to U.S. Appl. No. 14/496,262; 16 Pages.
Response to U.S. Office Action dated Dec. 4, 2014 corresponding to U.S. Appl. No. 14/496,262; Response filed Dec. 11, 2014; 12 Pages.
U.S. Notice of Allowance dated Jan. 9, 2015 corresponding to U.S. Appl. No. 14/496,262; 8 Pages.
312 Amendment filed Feb. 5, 2015 corresponding to U.S. Appl. No. 14/496,262; 9 Pages.
U.S. Notice of Allowance dated Mar. 16, 2015 corresponding to U.S. Appl. No. 14/620,631; 10 Pages.
U.S. Final Office Action dated Jun. 20, 2017 for U.S. Appl. No. 14/228,971; 40 Pages.
U.S. Non-Final Office Action dated Jun. 2, 2017 for U.S. Appl. No. 15/079,208; 19 Pages.
Response to U.S. Non-Final Office Action dated Feb. 9, 2017 for U.S. Appl. No. 14/228,971; Response filed May 9, 2017; 12 Pages.
Response (w/RCE) to U.S. Final Office Action dated Jun. 20, 2017 for U.S. Appl. No. 14/228,971; Response filed Sep. 13, 2017; 14 Pages.
Response to Office Action dated Jun. 2, 2017 from U.S. Appl. No. 15/079,208, filed Sep. 5, 2017; 10 Pages.
U.S. Non-Final Office Action dated Oct. 4, 2017 for U.S. Appl. No. 14/228,971; 37 pages.

* cited by examiner

FAST STARTUP FOR MODULAR STORAGE SYSTEMS

BACKGROUND

Storage systems may utilize a plurality of storage devices (e.g., a storage array) to provide high performance scale-out storage. Distributed storage systems may include a plurality of nodes, each connected to a storage array, connected via a high-speed interconnect such as a switched fabric. Nodes may use remote direct memory access (RDMA) to directly access each other's memory.

A distributed storage system may include a number of independent functional modules (or "subsystems"), each capable of running on multiple nodes and communicating using shared memory space. A given subsystem may require a relatively large amount memory to function. Allocating subsystem memory can create a bottleneck during startup.

SUMMARY

Described herein are several embodiments of systems and processes to decrease startup time for subsystems of a storage system. According to some embodiments, subsystem memory is allocated using memory-mapped files.

According to one aspect of the disclosure, a method may comprise: generating pre-allocated memory regions for a plurality of subsystems within a storage system; and for each of the plurality of subsystems, initiating a process and mapping a corresponding one of the pre-allocated memory regions into the process's memory space.

In some embodiments, generating pre-allocated memory regions for a plurality of subsystems comprises calculating an amount of dynamic memory required by each of the plurality of subsystems. In certain embodiments, the method further comprises, for each of the plurality of subsystems, initializing data structures used by components of the subsystem. In one embodiment, the plurality of subsystems includes a management subsystem and the method may further comprise: for each of the plurality of subsystems, reporting to the management subsystem that the subsystem is ready to process I/O operations; and processing I/O operations using the plurality of subsystems.

In certain embodiments, the method further comprises regenerating a pre-allocated memory region for a subsystem in response to a binary associated with subsystem being modified. In one embodiment, regenerating a pre-allocated memory region for a subsystem comprises truncating a file within an in-memory file system.

In some embodiments of the method, generating a pre-allocated memory region for a subsystem comprises generating a file within an in-memory file system. In certain embodiments, the file is sized based on the subsystem's memory requirements. In one embodiment, mapping a corresponding one of the pre-allocated memory regions into the process's memory space comprises mapping the file into the process's memory space. In some embodiments, mapping the file into the process's memory space using mmap.

According to another aspect of the disclosure, a system comprises a processor, a volatile memory, and a non-volatile memory storing computer program code that when executed on the processor causes the processor to execute a process operable to perform one or more embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client" and "user" refer to any person, system, or other entity that uses a storage system to read/write data.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage array" is used herein to refer to any collection of storage devices. In some embodiments, a storage array may refer to a RAID (Redundant Array of Inexpensive/Independent Disks).

As used herein, the term "random access storage device" refers to any non-volatile random access memory (i.e., non-volatile memory wherein data can be read or written in generally the same amount of time irrespective of the physical location of data inside the memory). Non-limiting examples of random access storage devices include NAND-based flash memory, single level cell (SLC) flash, multilevel cell (MLC) flash, and next generation non-volatile memory (NVM). For simplicity of explanation, the term "disk" may be used synonymously with "storage device" herein.

While vendor-specific terminology may be used herein to facilitate understanding, it is understood that the concepts, techniques, and structures sought to be protected herein are not limited to use with any specific commercial products.

Figure 1:
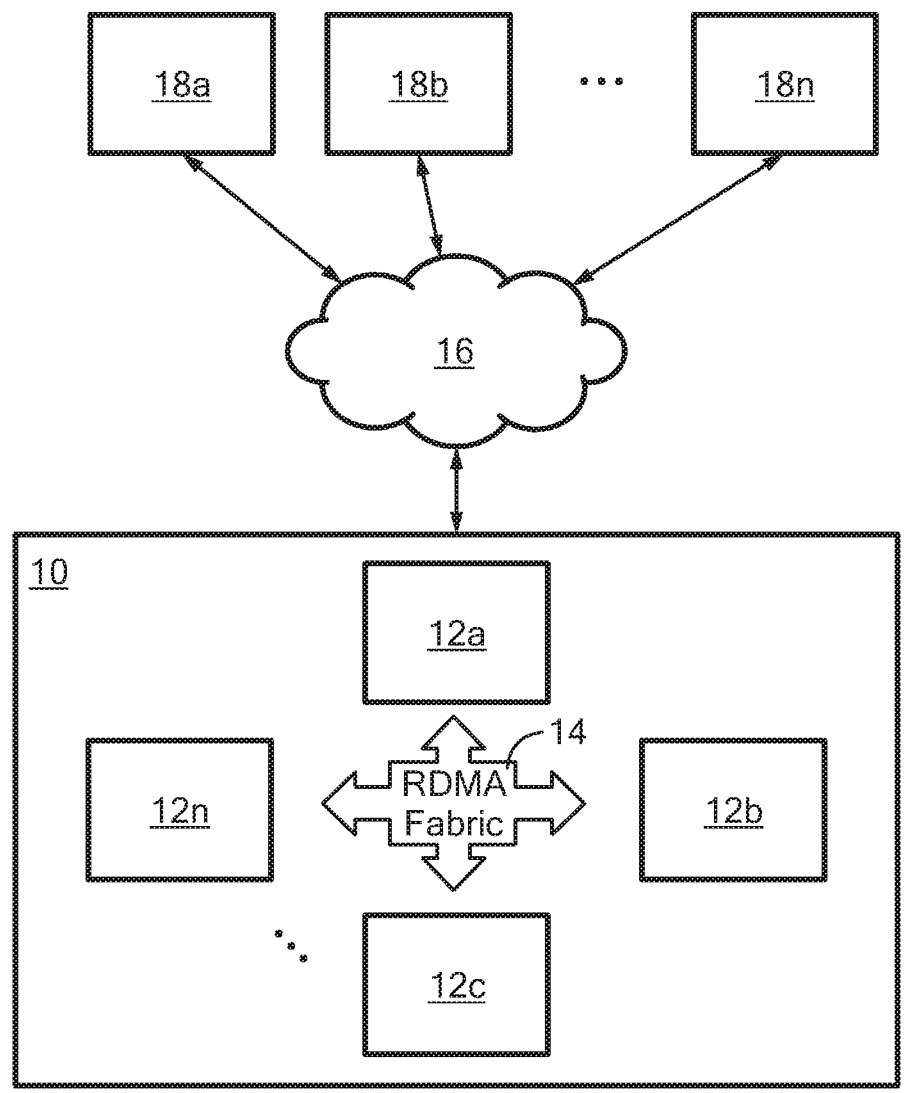
FIG. 1 is a block diagram of a distributed storage system in accordance with an embodiment of the disclosure.

FIG. 1 illustrates clients accessing a distributed storage system, according to embodiments of the disclosure. A distributed storage system 10 may include a plurality of nodes 12a, 12b, 12c, . . . 12n (generally denoted 12 herein). The nodes 12 (or "storage controllers") may be coupled via a high-speed interconnect 14. In one embodiment, the interconnect 14 may implement the switched fabric using, for example, the InfiniBand standard.

The distributed storage system 10 may provide block-based storage to various types of clients (or "users") 18a, 18b, . . . 18n (generally denoted 18 here). In some embodiments, clients 18 can access the distributed storage system 10 via a network 16. In one embodiment, the network 16 may include Fibre Channel and/or high-speed Ethernet links. On some embodiments, clients 18 include Small Computer System Interface (SCSI) clients.

In some embodiments, each node 12 may include an array of non-volatile storage devices to store data. In one embodiment, all storage arrays and storage devices are accessible to all nodes 12.

Clients 18 can issue I/O operations (i.e., read and write operations) to the distributed storage system 100. An I/O operation may be received by any available node 12. Regardless of which node receives the I/O operation, multiple nodes 12 may cooperate to process the I/O operation.

The distributed storage system 10 may include various independent functional modules (or "subsystems") that cooperate to process an I/O operation. A given subsystem may run on one or more nodes 12. In some embodiments, a subsystem running on multiple nodes may share memory space using remote direct memory access (RDMA). In certain embodiments, a given subsystem may require a relatively large amount of memory to function (e.g., 128 GB of RAM). In various embodiments, the distributed storage system 10 may utilize techniques described below in conjunction with FIGS. 3 and 4 to provide fast subsystem startup.

Figure 2:
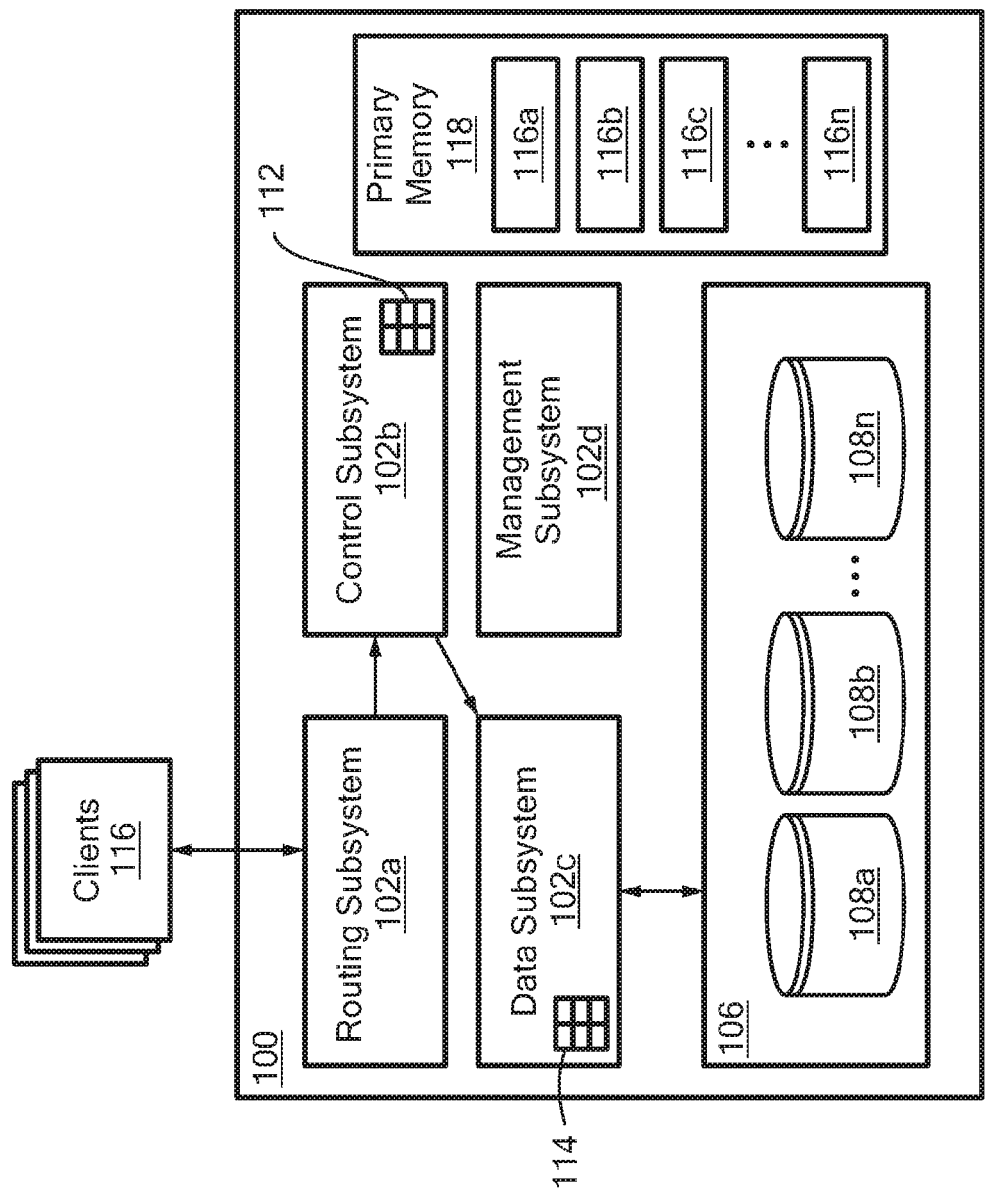
FIG. 2 is a block diagram of a storage system in accordance with an embodiment of the disclosure.

FIG. 2 shows a storage system 100 according to an illustrative embodiment of the disclosure. The storage system 100 may be the same as or similar to a node 12 within the distributed storage system 10 of FIG. 1.

The storage system 100 may include a plurality of subsystems 102a-102d (generally denoted 102 herein), a storage array 106 comprising a plurality of storage devices 108a ... 108n (generally denoted 108 herein), and a primary memory 118. In some embodiments, the storage devices 108 may be provided as random access storage devices, such as SSDs.

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 118 using, for example, an external application programming interface (API) and to translate client I/O operations into internal commands. In some embodiments, the routing subsystem 102a is configured to receive commands from SCSI clients 118. In certain embodiments, the system 100 may store data in fixed-size chunks, for example 4K chunks, where each chunk may have a unique hash value (referred to herein as a "chunk hash"). In such embodiments, the routing subsystem 102a may be configured to split data into fixed-size chunks and to calculate the corresponding chunk hashes. In one embodiment, chunk hashes are calculated using Secure Hash Algorithm 1 (SHA-1) processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 2, this mapping may be maintained using a data structure 112, referred to herein as an "I/O address to chunk hash mapping table" or "A2H table," according to some embodiments. In one embodiment, I/O addresses may be logical addresses used by clients 118 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," according to some embodiments. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 118 uses to access data and the physical address where that data is stored. Among other advantages, this can give the storage system 100 freedom to move data within the storage array 106 without affecting a client's 118 access to that data (e.g., if a storage device 108 fails).

The management subsystem 102d may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 3 and 4. In some embodiments, the management subsystem 102d can also be configured to monitor other subsystems 102 (e.g., subsystems 102a-102c) and to use this information to determine when the storage system 100 may begin processing client I/O operations after a restart.

A subsystem 102 may store various information within primary memory 118. For example, the control subsystem 102b may store some or all of the information within the A2H table 112 in primary memory 118. Likewise, the control subsystem 102c may store some or all of the information within the H2P table 114 in primary memory 118. In some embodiments, subsystems 102 cache metadata within primary memory 118 to improve system performance. In some embodiments, a subsystem 102 may maintain change journal to efficiently handle changes to metadata or other information. Such change journals may also be stored in primary memory 118. In one embodiment, a subsystem 102 may require up to 128 GB of primary memory to function normally.

A subsystem 102 may experience planned and unplanned restarts. Unplanned restarts may result from software faults that affect one or more subsystems 102. A subsystem restart may require de-allocating and or allocating a large amount of memory, which may be slow using conventional techniques. Even if multiple instances of a subsystem are running, slow restarts can negatively affect system performance.

In various embodiments, the storage system 100 may utilize techniques described below in conjunction with FIGS. 3 and 4 to provide fast subsystem 102 startup. In particular, the management subsystem 102d may be configured to allocate one or more memory regions 116a . . . 116n (generally denoted 116 herein) within primary memory 118. Each allocated memory region 116 may be associated with a particular subsystem 102 and may be generated prior to that subsystem 102 starting up. Thus, the regions 116 are herein referred to as "pre-allocated memory regions" 116. When a particular subsystem 102 starts up, it can locate a corresponding pre-allocated memory region 116 and map that region 116 into its process memory space, thereby avoiding allocating a large amount of memory at startup.

In various embodiments, the storage system 100 uses a mechanism to prevent the pre-allocated memory regions 116 from being de-allocated (e.g., by the OS). In one embodiment, the storage system 100 generates a file system that is mapped onto primary memory 118 (i.e., an in-memory file system). Here, the pre-allocated memory regions 116 may correspond to files within the in-memory file system. These memory-mapped files provide a reference to the memory regions 116 and, thus, can prevent the pre-allocated memory regions 116 from being de-allocated between subsystem 102 restarts.

In some embodiments, the storage system 100 includes features used in EMC® XTREMIO®.

Figure 3:
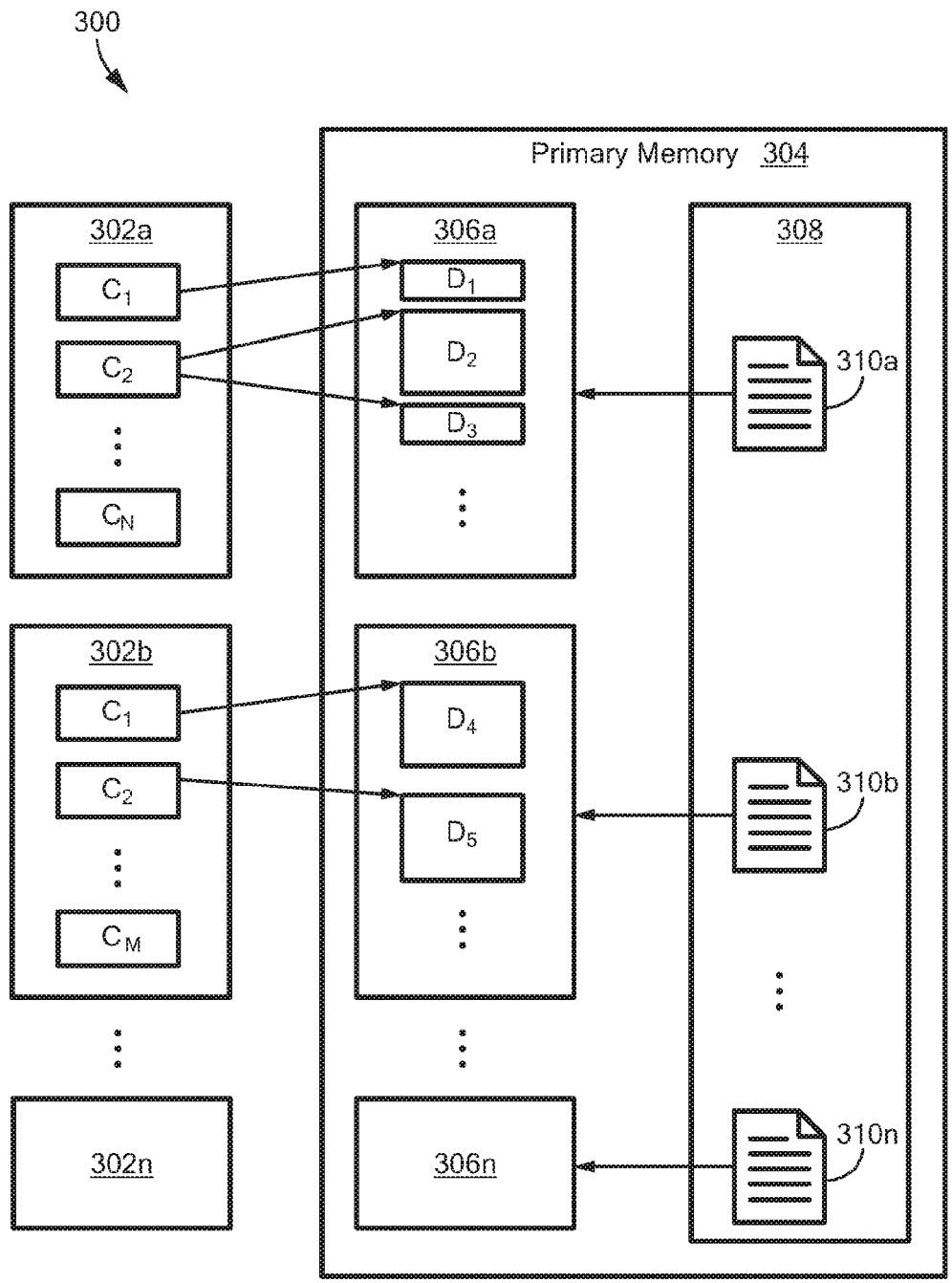
FIG. 3 is a diagram of an illustrative memory allocation scheme in accordance with an embodiment of the disclosure.

FIG. 3 illustrates a memory allocation scheme that can be used to provide faster subsystem startup within a storage system, in accordance with an embodiment of the disclosure. A storage system 300 may include a plurality of subsystems 302a, 302b, 302n (generally denoted 302 herein) and a primary memory 304. In one embodiment, subsystems 302 may be the same as or similar to subsystems 102 in FIG. 2 and primary memory 304 may be the same as or similar to primary memory 118 in FIG. 2.

In some embodiments, the subsystems 302 correspond to processes running (or runnable) within of a computer operating system (OS) or kernel. An OS may manage system memory resources (e.g., primary memory 304) by partitioning memory into pages and allocating pages to individual processes. For clarity of explanation, the portions of primary memory 304 assigned to a given subsystem 302 will be referred to hereinafter as the "process memory space."

Each subsystem 302 may be associated with a corresponding process memory space 306 within primary memory 304. In the example shown, subsystem 302a is associated with process memory space 306a, subsystem 302b is associated with process memory space 306b, etc.

Each subsystem 302 can include one or more components $C_1, C_2, \ldots C_N$ (generally denoted C herein). For example, referring to FIG. 2, the A2H table 112 within the control subsystem 102b may correspond to a component C, as may the H2P table 114 within the data subsystem 102c. A component can utilize one or more data structures D that occupy a portion of the corresponding process memory space 306. For example, in the simplified example of FIG. 3, subsystem 302a may include a first component $C_1$ that utilizes data structure $D_1$ and a second component $C_2$ that utilizes data structures $D_2$ and $D_3$.

In various embodiments, to enable fast startup, some or all of a subsystem's process memory space 306 may be mapped to a pre-allocated memory region 306 (i.e., a region of primary memory 306 that may be allocated prior to a subsystem's startup). In some embodiments, a pre-allocated memory region 306 may correspond to a file within an in-memory file system 308 and, thus, may be referred to herein as a "memory pre-allocation file" 310. For example, in FIG. 3, process memory space 306a (assigned to subsystem 302a) may be mapped to memory pre-allocation file 310a, process memory space 306b (assigned to subsystem 302b) may be mapped to memory pre-allocation file 310b, etc. As explained above in conjunction with FIG. 2, in certain embodiments, this arrangement can prevent the pre-allocated memory regions 310 from being de-allocated between subsystem restarts.

When a memory pre-allocation file 310 is generated, it may be sized based upon the memory requirements for a particular subsystem 302. The size of a pre-allocation file 310 determines how much memory will be available to the subsystem (notwithstanding additional memory that the subsystem may allocate). In some embodiments, the total memory used by a subsystem 302 is generally fixed, meaning that it does not change unless the subsystem 302 itself is updated (e.g., if the code or binary used to implement the subsystem is updated) or if some system-level change occurs (e.g., a hardware upgrade or, in some cases, a system reboot). Thus, a subsystem's required memory space can normally be determined prior to the subsystem starting up.

In some embodiments, the total memory required by a subsystem 302 can be calculated based on the memory required by each of its components C. In certain embodiments, the management subsystem 102d (FIG. 1) is configured to calculate the required memory for each subsystem 302. When calculating the amount of memory required for a given subsystem 302, the management subsystem 102d may take into account both dynamic memory requirements and static memory requirements.

In certain embodiments, a subsystem's dynamic memory requirements may include metadata used to process I/O operations. In other embodiments, metadata stored within a process memory space may include address-based metadata (e.g., information used within the A2H table 112 of FIG. 2) and hash-based metadata (e.g., information used within the H2P table 114 of FIG. 2). Thus, it will be appreciated that the actual amount of metadata used by a subsystem may depend on the client I/O patterns which, in general, are a priori unknown. Thus, in some embodiments, a fixed amount of memory is allocated to each subsystem for metadata and it is left to the subsystem (or its components) to utilize the memory as appropriate.

In certain embodiments, a subsystem's static memory requirements may include metadata or other information that has a fixed size, meaning that its size is not determined by user behavior. In some embodiments, a memory pre-allocation file 310 defines the amount of dynamic memory for a subsystem, but not the subsystem's static memory. In other embodiments, the subsystem components C can allocate static memory at startup. In some embodiments, the management subsystem 102d may limit the amount of static memory that a subsystem can allocate and, in such embodiments, if a subsystem 302 (or a component C thereof) attempts to allocate additional memory, startup will fail. Thus, the total memory that can be allocated to the subsystems, including both dynamic memory and static memory, can be known prior to startup. It should be noted that after initial startup of a subsystem has succeeded, subsequent startups will succeed as well because, in a preferred embodiment, the static memory requirements will not change.

In some embodiments, a memory pre-allocation file 310 can be generated once, the first time the corresponding subsystem starts up. In some embodiments, a memory pre-allocation file 310 may be regenerated when the corresponding subsystem is changed via a software upgrade. In certain embodiments, memory pre-allocation files 310 may also be regenerated after a hardware reboot or other system-wide event. In some embodiments, a memory pre-allocation file 310 may be stored in a shared directory within the in-memory file system 308, thus keeping a positive reference count regardless of whether the holding process (i.e., the subsystem 302) is running.

In some embodiments, a memory pre-allocation file 310 may be created using the "mmap" system call available on various UNIX-type operating systems. In one embodiment, every memory page in a newly generated memory pre-allocation file 310 may be "touched" (i.e., written to) to force actual allocation, regardless of whether the page will be used or not by the subsystem. This ensures that the memory pre-allocation file 310 has the correct size even if the OS/kernel employs an on-demand allocation techniques.

In some embodiments, during subsystem startup, if the corresponding memory pre-allocation file 310 exists, then the subsystem's dynamic memory can be allocated by mapping the file 310 into the subsystem process memory space. It is appreciated that, in such embodiments, this may be significantly faster than using convention memory allocation techniques. In some embodiments, the "mmap" system call can be used to map the memory pre-allocation file 310. In some embodiments, the pre-allocated memory file 310 may include unwanted data which may also be mapped into the process memory space. Because it may be costly to initialize the memory (e.g., by zeroing it out), in some embodiments the subsystem components C may be responsible for re-initializing their data structures D as needed.

In addition, in some embodiments, subsystem components may be responsible for loading static data (or other data needed to process I/O operations) into the data structures D. In some embodiments, components load minimal data required to begin processing I/O operations. In one embodiment, metadata is loaded on an as-needed basis as I/O operations are processed. In some embodiments, metadata may be lazy loaded using a background process to reduce the impact on client I/O processing.

In some embodiments, once a subsystem 302 has initialized its data structures D and loaded any required data, it may report to the management subsystem 102d that it is ready to begin processing I/O operations. In certain embodiments, subsystems 302 must obtain permission from the management subsystem 102d before they may begin processing client I/O, thereby allowing the management subsystem 102d to coordinate subsystem startup as needed.

As mentioned above, in some embodiments, a memory pre-allocation file 310 may be regenerated if the corresponding subsystem is modified (e.g., if the corresponding code or binary is updated). In such embodiments, this may be necessary because changes to a subsystem 102 may affect its static and/or dynamic memory requirements. In some embodiments, if a subsystem's memory requirements decrease, the corresponding memory pre-allocation file 310 may be truncated to a new size. In such embodiments, this can be done in the background so as not to impact the subsystem's startup time. Conversely, in other embodiments, if a subsystem's required memory increases, then the corresponding memory pre-allocation file 301 may be increased by allocating additional pages. In some embodiments, the additional pages may be "touched" to force actual allocation.

Figure 4:
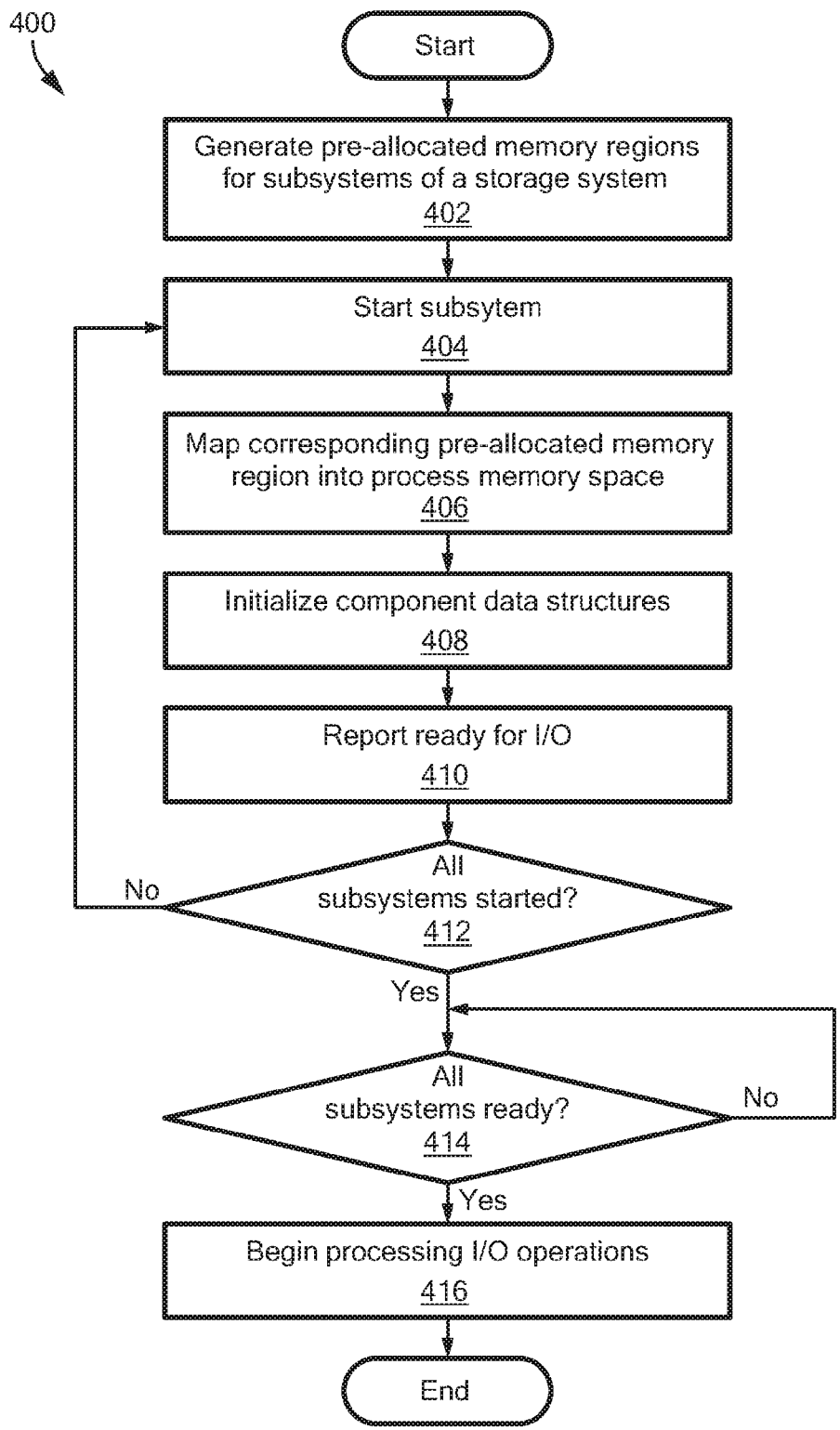
FIG. 4 is flow diagram illustrating processing that may occur within a storage system in accordance with some embodiments of the disclosure.

FIG. 4 is a flow diagram showing illustrative processing that can be implemented within a storage system, such as storage system 100 of FIG. 2. Rectangular elements (typified by element 402 in FIG. 4), herein denoted "processing blocks," represent computer software instructions or groups of instructions. Diamond shaped elements (typified by element 412 in FIG. 4), herein denoted "decision blocks," represent computer software instructions, or groups of instructions, which affect the execution of the computer software instructions represented by the processing blocks. Alternatively, the processing and decision blocks may represent steps performed by functionally equivalent circuits such as a digital signal processor (DSP) circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

FIG. 4 illustrates a process for decreasing startup time for subsystems of a storage system, according to embodiments of the disclosure. At block 402, for one or more subsystems of a storage system, corresponding regions of primary memory may be allocated (i.e., pre-allocated). In some embodiments, the pre-allocated memory regions are generated as files within an in-memory file system. The size of the pre-allocated memory regions may be selected based on subsystem memory requirements, using techniques described above in conjunction with FIG. 3.

At block 404, a given subsystem may be started. In some embodiments this comprises commencing a process within an OS. At block 406, a pre-allocated memory region corresponding to the subsystem may be mapped into the process memory space. In some embodiments, this includes mapping a file into the process memory space (e.g., using the "mmap" system call), where the file is stored within an in-memory file system.

At block 408, components within the subsystem may initialize their data structures. At block 410, the subsystem may report that it is ready to process I/O operations. In some embodiments, block 410 includes reporting to a management subsystem 102d (FIG. 1). The processing of blocks 404-410 may be repeated for multiple subsystems until, at block 412, all required subsystems have started. In some embodiments, multiple subsystems can start up in parallel.

After all subsystems have reported that they are ready to process I/O operations (block 414), the storage system may begin processing I/O operations (block 416), such as I/O operations issued by clients 118 of FIG. 2.

Figure 5:
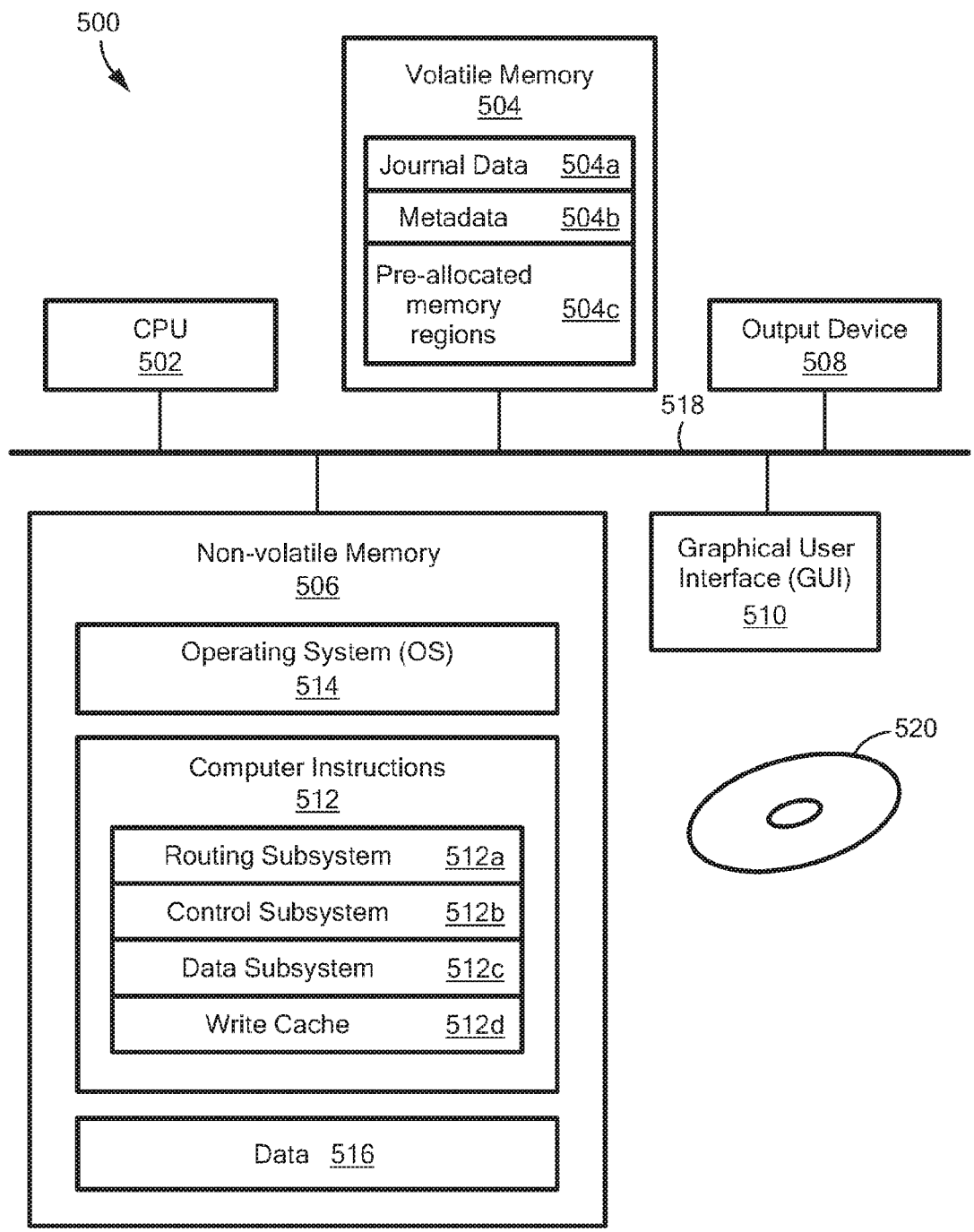
FIG. 5 is a schematic representation of an illustrative computer in accordance with an embodiment of the disclosure.

FIG. 5 shows an illustrative computer (e.g., physical or virtual) or other processing device 500 that can perform at least part of the processing described herein. In some embodiments, the computer 500 forms a part of a storage system, such as storage system 100 of FIG. 2. The computer 500 may include a processor 502, a volatile memory 504, a non-volatile memory 506 (e.g., hard disk or SSD), an output device 508 and a graphical user interface (GUI) 510 (e.g., a mouse, a keyboard, a display, for example), each of which is coupled together by a bus 518. The non-volatile memory 506 may be configured to store computer instructions 512, an operating system 514, and data 516. In one embodiment, the computer instructions 512 are executed by the processor 502 out of volatile memory 504. In some embodiments, an article 520 comprises non-transitory computer-readable instructions.

In the embodiment shown, computer instructions 512 include routing subsystem instructions 512a that may correspond to an implementation of a routing subsystem 102a (FIG. 2), control subsystem instructions 512b that may correspond to an implementation of a control subsystem 102b, data subsystem instructions 512c that may correspond to an implementation of a data subsystem 102c, and journal subsystem instructions 512d that may correspond to an implementation of a journal subsystem 102d.

As shown, in some embodiments, volatile memory 504 may be configured to store journal data 504a, metadata 504b, and pre-allocated memory regions 504c. A pre-allocated memory region 504c may be allocated for specific subsystems 102 (FIG. 1) and mapped into that subsystem's process memory at startup. In some embodiments, pre-allocated memory regions 504c correspond to files within an in-memory file system.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method comprising:
generating pre-allocated memory regions for a plurality of subsystems within a storage system; and
for each of the plurality of subsystems;
initiating a process; and
mapping a corresponding one of the pre-allocated memory regions into a memory space of the process, wherein a pre-allocated memory region is generated prior to a corresponding subsystem starting up,
wherein the plurality of subsystems includes a management subsystem, the method further comprising:
for each of the plurality of subsystems other than the management subsystem, reporting to the management subsystem that the subsystem is ready to process I/O operations;
processing I/O operations using the plurality of subsystems;
regenerating a pre-allocated memory region for a subsystem in response to a binary associated with subsystem being modified,
wherein regenerating a pre-allocated memory region for a subsystem comprises truncating a file within an in-memory file system.

2. The method of claim 1 wherein generating pre-allocated memory regions for a plurality of subsystems within a storage system comprises calculating an amount of dynamic memory required by each of the plurality of subsystems.

3. The method of claim 1 further comprising:
for each of the plurality of subsystems, initializing data structures used by components of the subsystem.

4. The method of claim 1 wherein generating a pre-allocated memory region for a subsystem comprises generating a file within an in-memory file system.

5. The method of claim 4 wherein the file is sized based on the subsystem's memory requirements.

6. The method of claim 4 wherein mapping a corresponding one of the pre-allocated memory regions into the process's memory space comprises mapping the file into the process's memory space.

7. The method of claim 6 wherein mapping the file into the process's memory space comprises using mmap.

8. A system comprising:
a processor;
a volatile memory; and
a non-volatile memory storing computer program code that when executed on the processor causes the processor to execute a process operable to perform the operations of:
generating pre-allocated memory regions for a plurality of subsystems within a storage system, wherein a pre-allocated memory region is generated prior to a corresponding subsystem starting up; and for each of the plurality of subsystems,
   initiating a process; and
      mapping a corresponding one of the pre-allocated memory regions into a memory space of the process, wherein the plurality of subsystems includes a management subsystem, the method further comprising:
   for each of the plurality of subsystems other than the management subsystem, reporting to the management subsystem that the subsystem is ready to process I/O operations;
   processing I/O operations using the plurality of subsystems;
   regenerating a pre-allocated memory region for a subsystem in response to a binary associated with subsystem being modified, wherein regenerating a pre-allocated memory region for a subsystem comprises truncating a file within an in-memory file system.

9. The system of claim 8 wherein the computer program code that when executed on the processor causes the processor to execute a process operable to generate pre-allocated memory regions for subsystems within a storage system by calculating an amount of dynamic memory required by each of the plurality of subsystems.

10. The system of claim 8 wherein the computer program code that when executed on the processor causes the processor to execute a process is operable to perform the further operations of:
   for each of the plurality of subsystems, initializing data structures used by components of the subsystem.

11. The system of claim 8 wherein the computer program code that when executed on the processor causes the processor to execute a process operable to generate a pre-allocated memory region for a subsystem by generating a file within an in-memory file system.

12. The system of claim 11 wherein the file is sized based on the subsystem's memory requirements.

13. The system of claim 11 wherein the computer program code that when executed on the processor causes the processor to execute a process operable to map a corresponding one of the pre-allocated memory regions into the process's memory space by mapping the file into the process's memory space.

14. The system of claim 13 wherein the computer program code that when executed on the processor causes the processor to execute a process operable to map the file into the process's memory space using mmap.

\* \* \* \* \*